United States Patent [19]

Kashiwabara

[11] Patent Number: 5,468,195
[45] Date of Patent: Nov. 21, 1995

[54] APPARATUS AND METHOD FOR CONTROL OF A VEHICLE FITTED WITH AN AUTOMATIC CONTINUOUSLY VARIABLE TRANSMISSION

[75] Inventor: Masuo Kashiwabara, Atsugi, Japan

[73] Assignee: Unisia Jecs Corporation, Atsugi, Japan

[21] Appl. No.: 202,120

[22] Filed: Feb. 25, 1994

[30] Foreign Application Priority Data

Feb. 25, 1993 [JP] Japan ..................... 5-036362

[51] Int. Cl.⁶ .................................................. B60K 41/14
[52] U.S. Cl. .................................................. 477/46
[58] Field of Search .................... 477/43, 46, 48

[56] References Cited

U.S. PATENT DOCUMENTS

| | | | |
|---|---|---|---|
| 4,546,673 | 10/1985 | Shigematsu et al. | 477/43 |
| 4,720,793 | 1/1988 | Watanabe et al. | 364/424.1 |
| 4,905,544 | 3/1990 | Ganoung | 364/424.1 |
| 5,243,881 | 9/1993 | Hayashi | 364/424.1 |

FOREIGN PATENT DOCUMENTS 1-187338 7/1989 Japan.

*Primary Examiner*—Dirk Wright
*Attorney, Agent, or Firm*—Foley & Lardner

[57] ABSTRACT

With an engine wherein the setting of a target air-fuel ratio is changed in accordance with operating conditions, and the air-fuel ratio of the engine intake mixture is controlled in accordance with the target air-fuel ratio, a gear ratio in an automatic continuously variable transmission fitted to the engine is forcibly changed towards a ratio which suppresses changes in vehicle drive torque, at the time of changing the setting of the target air-fuel ratio. As a result even with a rapid change in engine output torque following a change in the target air-fuel ratio, a rapid change in the vehicle drive torque can be suppressed, so that vehicle driving stability can be improved.

12 Claims, 4 Drawing Sheets

APPARATUS AND METHOD FOR CONTROL OF A VEHICLE FITTED WITH AN AUTOMATIC CONTINUOUSLY VARIABLE TRANSMISSION

FIELD OF THE INVENTION

The present invention relates to an apparatus and method for control of a vehicle fitted with an automatic continuously variable transmission, and more particularly to technology involving an internal combustion engine wherein the setting of a target air-fuel ratio in an air-fuel ratio control is changed in accordance with operating conditions, for controlling a change in vehicle drive torque accompanying to the change in the target air-fuel ratio.

DESCRIPTION OF THE RELATED ART

Recently as a means for improving fuel consumption, a lean combustion engine has been proposed wherein combustion is carried out at lean air-fuel ratios of for example 20–25 (referred to hereunder as a lean air-fuel ratio), which are significantly greater than the theoretical air-fuel ratio of 14.7. With such a lean combustion engine as disclosed for example in Japanese Unexamined Patent Publication No. 1-187338, fuel consumption is improved for example under low rpm/low load operation with combustion at the above-mentioned lean air-fuel ratio, while at the time of high rpm/high load or rapid acceleration, combustion is carried out at the theoretical or a slightly richer air-fuel ratio dedicated to maintaining torque performance (referred to hereunder as a power air-fuel ratio which includes the theoretical air-fuel ratio). Improvement in fuel consumption together with maintenance of output torque are thus both possible.

With the above mentioned lean combustion engine however, if the change of the target air-fuel ratio between the lean air-fuel ratio and the power air-fuel ratio is carried out rapidly, the vehicle drive torque changes suddenly due to a rapid change in engine output torque, so that the vehicle driver is likely to experience vibration.

In order to avoid the sudden change in vehicle drive torque accompanying the change in the air-fuel ratio, the construction can be such that the air-fuel ratio is changed gradually. However, due to the presence of an air-fuel ratio range between the lean air-fuel ratio and the power air-fuel ratio wherein the exhaust NOx concentrations peak, then with a gradual change in the air-fuel ratio, there is the possibility of a large amount of NOx emissions during the change.

Therefore up until now there has been a problem in that in keeping down the NOx emissions occurring during a change in air-fuel ratio, it is difficult to keep the rapid change in vehicle drive torque sufficiently small.

SUMMARY OF THE INVENTION

In view of the above mentioned problem, it is an object of the present invention, in the case of an engine fitted with an automatic continuously variable transmission, to suppress the rapid change in vehicle driving torque at the time of changing the setting of the target air-fuel ratio of the engine intake mixture, by controlling the gear ratio of the continuously variable transmission.

It is a further object to appropriately carry out the control of the gear ratio in order to suppress rapid changes in vehicle drive torque.

To achieve the above objectives, the apparatus and method according to the present invention for control of a vehicle fitted with an automatic continuously variable transmission and wherein the air-fuel ratio of the engine intake mixture is controlled to conform to a target air-fuel ratio which is alternately set in accordance with operating conditions, is constructed such that the gear ratio of the automatic continuously variable transmission fitted to the engine is forcibly changed towards a ratio which suppresses changes in vehicle drive torque, at the time of changing the setting of the target air-fuel ratio.

With such a construction, when the air-fuel ratio of the engine intake mixture changes with a change in the target air.-fuel ratio, resulting in a change in the engine output torque, fluctuations in vehicle drive torque are suppressed by forcible control of the gear ratio.

That is to say, in the arrangement wherein the gear ratio is fixed and the engine output torque changes in accordance with the change in the target air-fuel ratio, then the vehicle drive torque also changes in correspondence with the change in engine output torque. With the present invention however, the change characteristics between the engine output torque and the vehicle drive torque are changed by means of the gear ratio. As a result, the change in engine output torque does not follow through as a change in vehicle drive torque.

Here the construction may be such that the change in the setting in the target air-fuel ratio is carried out between a predetermined air-fuel ratio equal to or below the theoretical air-fuel ratio and a predetermined lean air-fuel ratio greater than the theoretical air-fuel ratio.

With such a construction, when the operating conditions are those requiring power, the air-fuel ratio is controlled to the air-fuel ratio equal to or below the theoretical air-fuel ratio, while when the operating conditions are those dedicated to fuel consumption, the air-fuel ratio is controlled to a lean air-fuel ratio. Also at the time of a change in operating conditions between those requiring power and those dedicated to fuel consumption, the gear ratio in the continuously variable transmission is controlled so that the vehicle drive torque does not change rapidly in spite of changes in the target air-fuel ratio.

Moreover, the construction may also be such that the change in the setting of the target air-fuel ratio is carried out based on the engine load and engine rotational speed.

With such a construction, the target air-fuel ratio is set based on the engine load and engine rotational speed, and is changed in correspondence with changes in engine load and engine rotational speed.

Furthermore, the construction may preferably be such that at the time of changing the setting of the target air-fuel ratio, the gear ratio is gradually changed by a characteristic which corresponds to the engine operating conditions.

With such a construction, the gear ratio of the continuously variable transmission can be changed to accurately correspond to the change in engine output torque accompanying the change in setting of the target air-fuel ratio, so that fluctuations in vehicle drive torque can be effectively suppressed.

Moreover, the control of the gear ratio at the time of changing the setting of the target air-fuel ratio may be such that the gear ratio is changed to increase when the target air-fuel ratio is changed in a direction to become lean, and is changed to reduce when the target air-fuel ratio is changed in a direction to become rich.

With such a construction, when for example the target air-fuel ratio is changed in a direction to become lean so that the engine output torque reduces, the gear ratio is changed to increase so that a reduction in vehicle drive torque due to the change in engine output torque in the transmission is suppressed.

Also, in the case of an automatic continuously variable transmission in the form of a continuously variable transmission mechanism incorporating a belt and pulley combination, an arrangement may be utilized wherein the gear ratio is continuously and variable controlled by changing the width of the pulley.

With such a construction, when the target air-fuel ratio is changed, the gear ratio can be changed by changing the width of the pulley, so that the fluctuations in vehicle drive torque can be suppressed.

Further objects and aspects of the present invention will become apparent from the following description of an embodiment given in conjunction with the accompanying drawings.

DETAILED DESCRIPTION OF A PREFERRED EMBODIMENT

FIG. 2 through FIG. 5, show an embodiment of the above mentioned apparatus and method for control of a vehicle fitted with an automatic continuously variable transmission according to the present invention.

Figure 2:
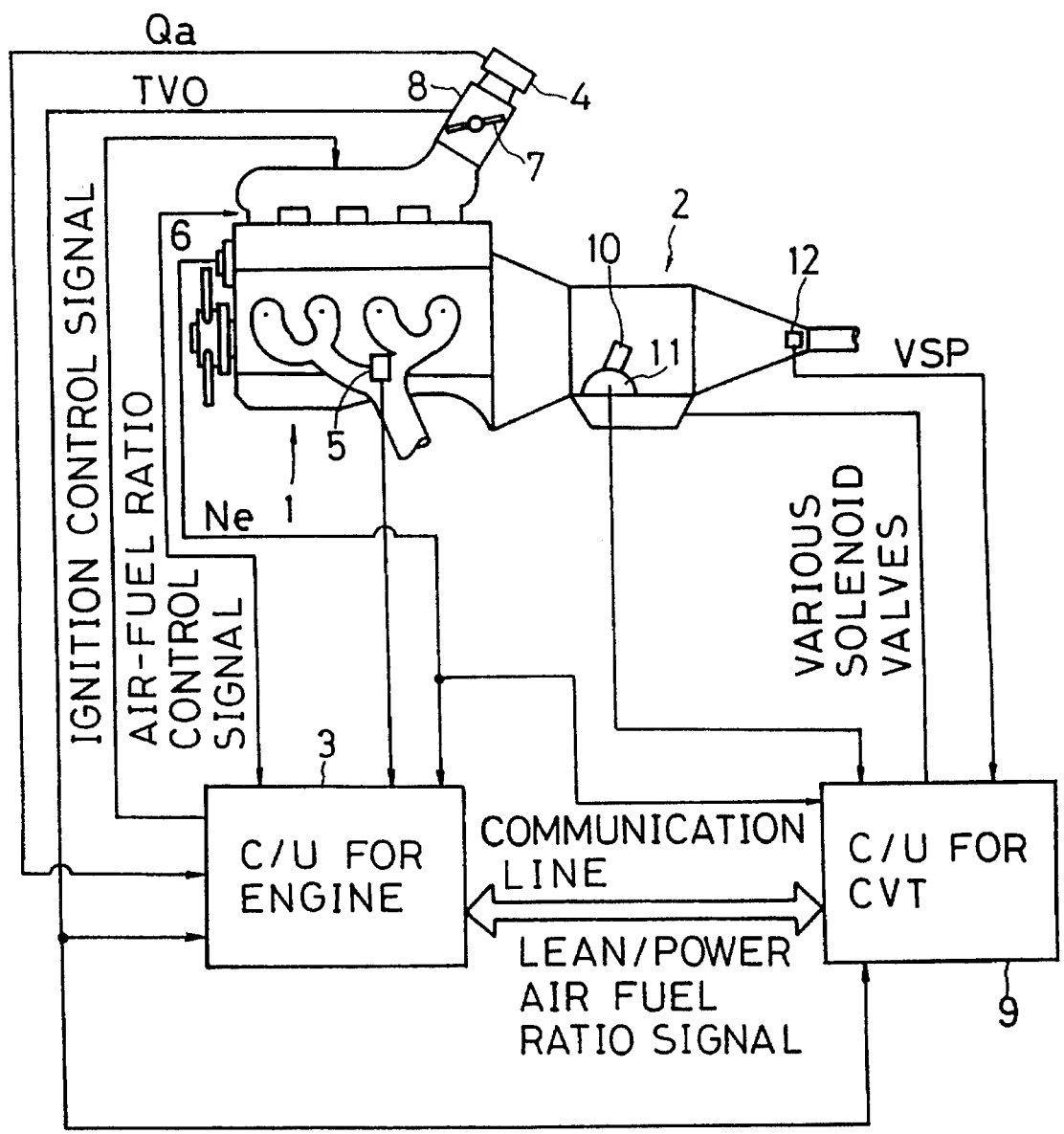
FIG. 2 is a schematic system diagram illustrating a system structure of an embodiment of the present invention.

As shown in FIG. 2 which illustrates a system structure of the embodiment, an internal combustion engine 1 which is mounted on a vehicle (not shown in the figure), is fitted with an automatic continuously variable transmission 2.

The automatic continuously variable transmission 2 is a conventional mechanical type continuously variable transmission generally referred to as a CVT (continuously variable transmission), comprising a continuously variable transmission mechanism incorporating a steel belt and pulley combination, and a magnetic clutch. The construction is such that the gear ratio is continuously and variable changed from a low ratio through to overdrive, by hydraulically changing the width of the pulley groove.

The engine 1 is provided with an electronically controlled fuel injection apparatus. With this apparatus, air-fuel ratio control signals for the fuel injection valves are output by means of a microcomputer based engine control unit 3 so as to produce a predetermined air-fuel ratio mixture.

Figure 1:
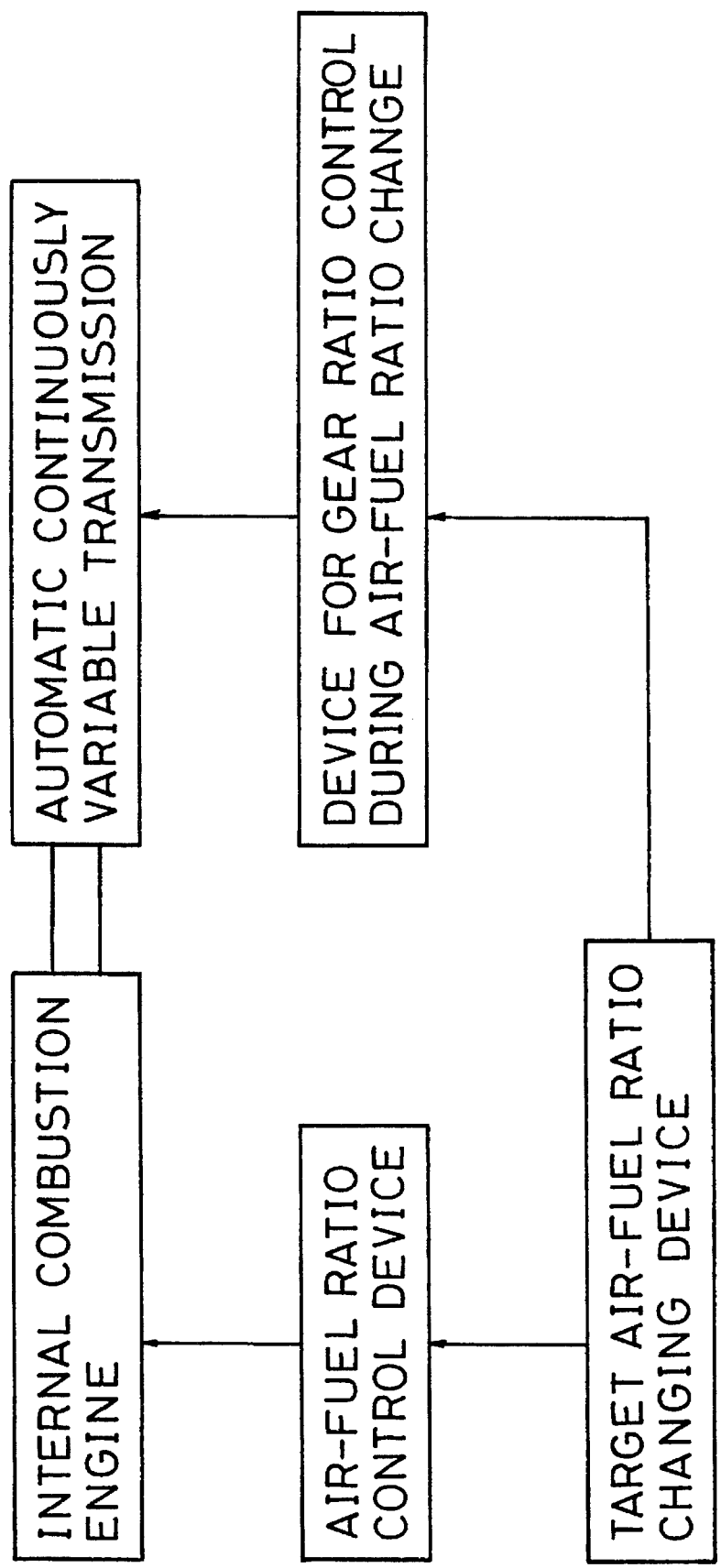
FIG. 1 is a block diagram illustrating a basic structure of the present invention.

Detection signals from various types of sensors are input to the engine control unit 3 which acts as an air-fuel ratio control device as shown in FIG. 1, so as to output the air-fuel ratio control signals.

Such sensors comprise for example an air flow meter 4 for detecting the engine 1 intake flow rate Qa, an oxygen sensor 5 for detecting the exhaust oxygen concentration, a crank angle sensor 6 which outputs a detection pulse signal for each predetermined crank angle, and a potentiometer type throttle sensor 8 for detecting a throttle valve opening TVO of a throttle valve 7 which is operated by a linkage to an accelerator pedal (not shown in the figure).

A basic fuel injection amount Tp equivalent to the target air-fuel ratio is computed based on the intake flow rate Qa and the engine rotational speed Ne computed on the basis of the detection signals from the crank angle sensor 6. In addition, a final fuel injection quantity Ti is computed by making for example an increase correction corresponding to cooling water temperature, and an air-fuel ratio feed back correction based on the detection results of the oxygen sensor 5, or the basic fuel injection amount Tp. A drive pulse signal having a pulse width corresponding to the fuel injection amount Ti is then output to the fuel injection valve at a predetermined timing synchronized with the engine rotational speed so that an amount of fuel necessary to produce the target air-fuel ratio is injected.

Here the engine control unit 3 also has the function of a target air-fuel ratio changing device as shown in FIG. 1, which changes the target air-fuel ratio for the engine intake mixture in accordance with the engine operating conditions, between a power air-fuel ratio equal to or below the theoretical air-fuel ratio (referred to hereunder as a power air-fuel ratio), and a lean air-fuel ratio of for example an air-fuel ratio of 20~25, significantly leaner than the power air-fuel ratio and referred to hereunder as a lean air-fuel ratio.

In this respect, the engine control unit 3 incorporates a map of target air-fuel ratios for a power air-fuel ratio range for high rotational speed/high load, and for a lean air-fuel ratio range for low speed/low load, the map having parameters of engine rotational speed Ne computed on the basis of detection signals from the crank angle sensor 6, and engine load equivalent values computed on the basis of the engine rotational speed Ne and the intake flow rate Qa detected by the air flow meter 4. The lean air-fuel ratio and power air-fuel ratio are thus selectively set from the map, as the target air-fuel ratio.

The construction may have, in addition to the information on engine load and engine rotational speed Ne, a control function wherein the target air fuel ratio becomes the power air-fuel ratio at the time of acceleration of the engine 1. The change conditions between the power air-fuel ratio and the lean air-fuel ratio are not limited to the before-mentioned arrangement.

A microcomputer based CVT control unit 9 for controlling the automatic continuously variable transmission 2 is provided separately from the engine control unit 3.

The CVT control unit 9 is connected for signal communication to the engine control unit 3. However as well as receiving the detection signals from the crank angle sensor 6, and the throttle sensor 8, it also receives a select signal from a range switch 11 which detects a select range position of a CVT select lever 10, and a vehicle speed detection signal from a speed sensor 12 which derives a rotational signal from rotation of the output shaft of the automatic continuously variable transmission 2. Then on the basis of the throttle valve opening TVO (due to accelerator operation), engine rotational speed, and vehicle speed, the operating pressure for the primary and secondary pulley is changed to thereby control the width of the pulley groove and give a predetermined gear ratio.

Here as shown in FIG. 1, the CVT control unit 9 incorporates a device for speed change control during air-fuel ratio change, with the function of controlling the gear ratio in a direction to suppress fluctuations in vehicle drive torque at the time of changing the setting of the target air-fuel ratio, on the basis of a target air-fuel ratio switching signal from the engine control unit 3.

Figure 5:
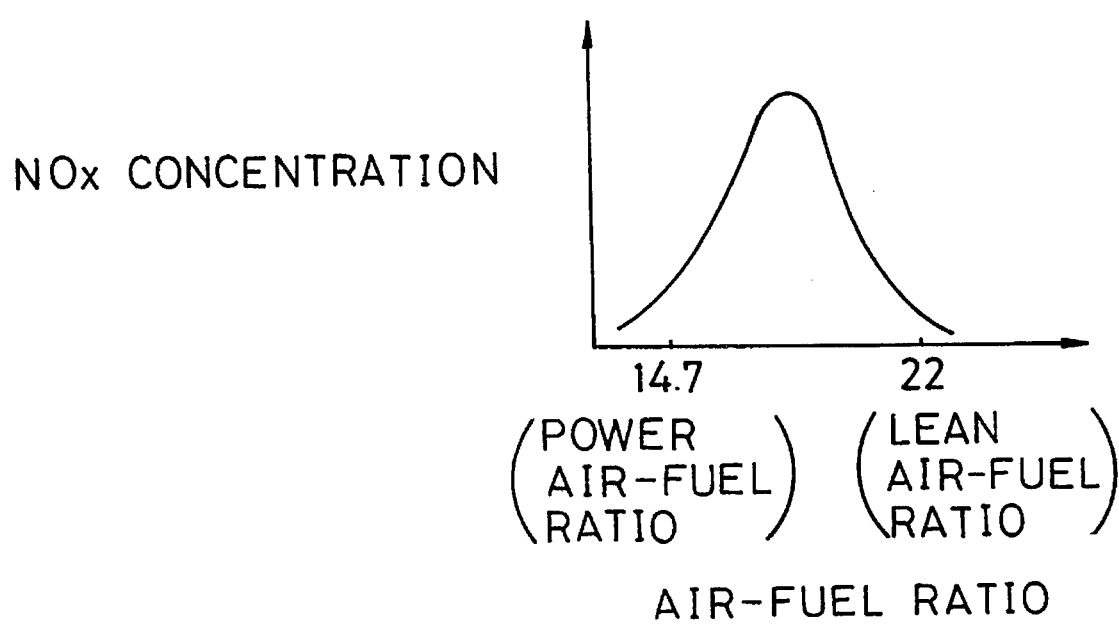
FIG. 5 is a graph showing a relationship between air-fuel ratio and NOx concentration.

In this respect, since as shown in FIG. 5, the exhaust NOx concentrations peak at an air-fuel ratio between the power air-fuel ratio and the lean air-fuel ratio, then from an exhaust conditions point of view, the air-fuel ratio switching speed should be fast so as to quickly pass through the air-fuel ratio wherein the NOx concentrations peak. However, a fast switching invites a rapid change in engine output torque, with a consequent rapid change in vehicle drive torque which can be felt as vibrations by the vehicle driver.

Here the device for speed change control during air-fuel ratio change which is provided in the CVT control unit 9 (see FIG. 1) has a compensating function preventing large fluctuations in the vehicle drive torque. This is achieved by forcibly controlling the gear ratio in correspondence with the change in engine output torque following a change in target air-fuel ratio of the engine 1, in a direction to suppress fluctuations in the vehicle drive torque.

Aspects of gear ratio control by the CVT control unit 9 at the time of switching of the air-fuel ratio are described below with reference to the flow chart of FIG. 3.

Figure 3:
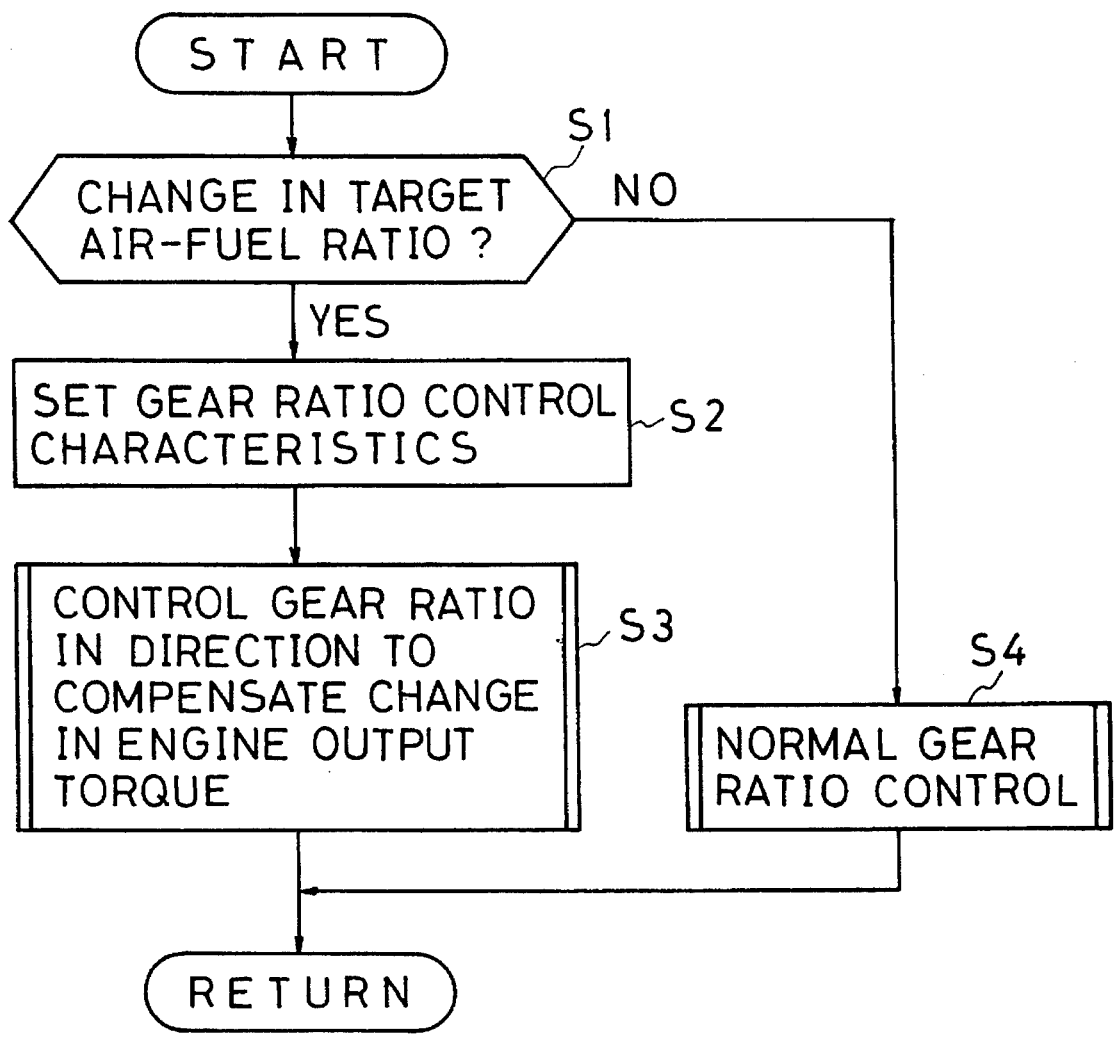
FIG. 3 is a flow chart illustrating a gear ratio control according to the embodiment.

As shown in the flow chart of FIG. 3, initially in step 1, (with "step" denoted by S in the figures) it is judged if a signal for changing the target air-fuel ratio has been output from the engine control unit 3.

If found that the target air-fuel ratio is being changed, control proceeds to step 2, where the gear ratio control characteristics (gear ratio change amount, step change amount per unit time interval etc.) are set on the basis of information such as engine load and engine rotational speed. That is to say, are set so that gear ratio control for suppressing the change in vehicle drive torque at the time of change in target air-fuel ratio, can be carried out with appropriate characteristics to meet operating conditions at the time.

Then in the next step 3, control is carried out to gradually change the gear ratio in accordance with the control characteristics set in step 2, from the existing gear ratio set under normal control, in a direction corresponding to a change in the target air-fuel ratio. That is to say, in a direction to absorb the change in engine output torque due to the change in target air-fuel ratio, and thus suppress the change in vehicle drive torque.

Figure 4:
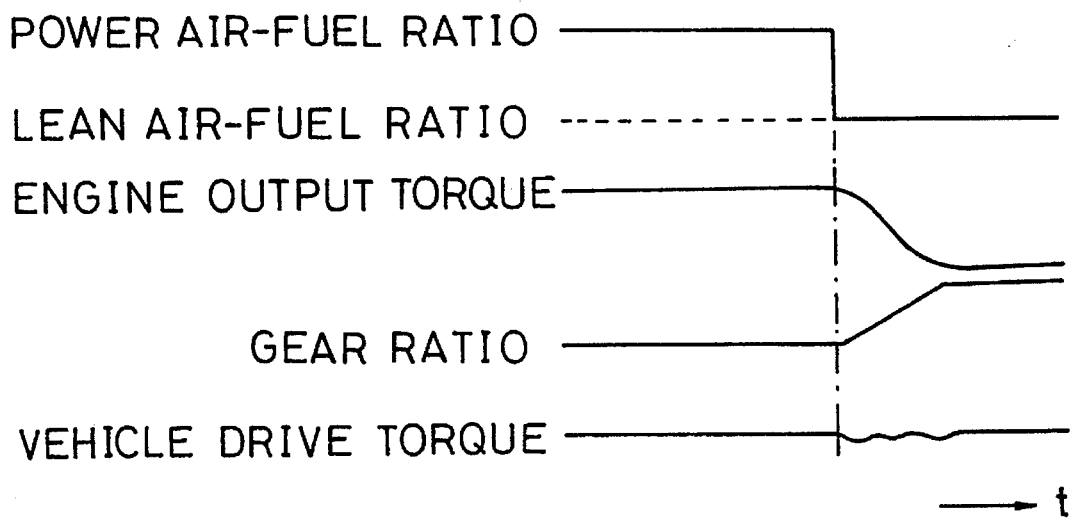
FIG. 4 is a time chart illustrating the characteristics of the gear ratio control according to the embodiment.

For example, when as shown in FIG. 4, the target air-fuel ratio is changed from the power air-fuel ratio to the lean air-fuel ratio, since the engine output torque changes in a reducing direction, the gear ratio is changed to increase to correct for the resultant reduction in torque. The vehicle drive torque is thus compensated so as to remain approximately uniform in spite of the change in air-fuel ratio.

When on the other hand in step 1 it is judged that the target air-fuel ratio is not being changed, control proceeds to step 4 where normal automatic gear ratio control is carried out.

With such a construction, even when the target air-fuel ratio of the engine 1 is changed rapidly, the follow through of the rapid change in engine torque output due to the switching of the target air-fuel ratio, as a resultant rapid change in vehicle drive torque can be avoided. Hence driving stability can be ensured while avoiding an increase in NOx emissions at the time of changing the air-fuel ratio.

In this respect, as shown in FIG. 5, due to the presence of an air-fuel ratio range between the lean air-fuel ratio and the power air-fuel ratio wherein the exhaust NOx concentrations are a maximum, then in order to keep down the NOx emissions occurring at the time of changing of the target air-fuel ratio, the air-fuel ratio is preferably changed rapidly between the lean air-fuel ratio and the power air-fuel ratio. However, a rapid change in air-fuel ratio invites a rapid change in engine output torque. With the above embodiment however, the gear ratio in the continuously variable transmission is controlled so as to absorb the rapid change in engine output torque, and thus prevent a rapid change in vehicle drive torque, so that even if the engine output torque changes rapidly due to a rapid change in air-fuel ratio, a resultant rapid change in the vehicle drive torque which can be felt as vibration by the driver can be avoided.

In the case of switching from the lean air-fuel ratio to the power air-fuel ratio at the time of rapid acceleration, since in this case power output response is required, then a construction is possible wherein at the time of rapid acceleration, the above-mentioned gear ratio control is cancelled.

What is claimed is:

1. An apparatus for controlling a vehicle fitted with an automatic continuously variable transmission, said apparatus comprising:

air-fuel ratio control means for controlling an air-fuel ratio of an engine intake mixture to conform to a target air-fuel ratio, target air-fuel ratio changing means for changing the target air-fuel ratio in said air-fuel ratio control means in accordance with operating conditions, and means for speed change control during air-fuel ratio change, for forcibly changing the gear ratio in the automatic continuously variable transmission fitted to the engine, towards a ratio which suppresses changes in vehicle drive torque, at the time of a changing the setting of the target air-fuel ratio by said target air-fuel ratio changing means.

2. An apparatus for controlling a vehicle fitted with an automatic continuously variable transmission as claimed in claim 1, wherein said target air-fuel ratio changing means changes the setting of the target air-fuel ratio between a predetermined air-fuel ratio equal to or below the theoretical air-fuel ratio, and a predetermined lean air-fuel ratio which is greater than the theoretical air-fuel ratio.

3. An apparatus for controlling a vehicle fitted with an automatic continuously variable transmission as claimed in claim 1, wherein said target air-fuel ratio changing means changes the setting of the target air-fuel ratio, based on the engine load and engine rotational speed.

4. An apparatus for controlling a vehicle fitted with an automatic continuously variable transmission as claimed in claim 1, wherein said means for speed change control during air-fuel ratio change, gradually changes the gear ratio by a characteristic which corresponds to the engine operating conditions.

5. An apparatus for controlling a vehicle fitted with an automatic continuously variable transmission as claimed in claim 1, wherein said means for speed change control during air-fuel ratio change, changes the gear ratio to increase when the target air-fuel ratio is changed in a direction to become lean, and to reduce when the target air-fuel ratio is changed in a direction to become rich.

6. An apparatus for controlling a vehicle fitted with an automatic continuously variable transmission as claimed in claim 1, wherein said automatic continuously variable transmission comprises a continuously variable transmission mechanism incorporating a belt and pulley combination, with the gear ratio continuously variable controlled by changing the width of the pulley.

7. A method for controlling a vehicle fitted with an automatic continuously variable transmission, said method comprising:

a step for changing the setting of a target air-fuel ratio of an engine intake mixture in accordance with operating conditions, a step for controlling the air-fuel ratio of the engine intake mixture in accordance with the target air-fuel ratio set by said step for changing the setting of a target air-fuel ratio, and a step for forcibly changing the gear ratio in the automatic continuously variable transmission fitted to the engine, towards a ratio which suppress changes in vehicle drive torque, at the time of said change in the setting of the target air-fuel ratio.

8. A method for controlling a vehicle fitted with an automatic continuously variable transmission as claimed in claim 7, wherein said step for changing the setting of a target air-fuel ratio, changes the setting of the target air-fuel ratio between a predetermined air-fuel ratio equal to or below the theoretical air-fuel ratio, and a predetermined lean air-fuel ratio which is greater than the theoretical air-fuel ratio.

9. A method for controlling a vehicle fitted with an automatic continuously variable transmission as claimed in claim 7, wherein said step for changing the setting of a target air-fuel ratio, changes the setting of the target air-fuel ratio, based on the engine load and engine rotational speed.

10. A method for controlling a vehicle fitted with an automatic continuously variable transmission as claimed in claim 7, wherein said step for forcibly changing the gear ratio, gradually changes the gear ratio by a characteristic which corresponds to the engine operating conditions.

11. A method for controlling a vehicle fitted with an automatic continuously variable transmission as claimed in claim 7, wherein said step for forcibly changing the gear ratio, changes the gear ratio to increase when the target air-fuel ratio is changed in a direction to become lean, and to reduce when the target air-fuel ratio is changed in a direction to become rich.

12. A method for controlling a vehicle fitted with an automatic continuously variable transmission as claimed in claim 7, wherein said automatic continuously variable transmission comprises a continuously variable transmission mechanism incorporating a belt and pulley combination, with the gear ratio continuously variable controlled by changing the width of the pulley.

* * * * *